(12) United States Patent
Demeter et al.

(10) Patent No.: US 12,547,694 B2
(45) Date of Patent: Feb. 10, 2026

(54) SYSTEMS AND METHODS FOR MANAGING ACCESS TO DATA BASED ON A GEOGRAPHIC LOCATION REQUIREMENT

(71) Applicant: Lenovo Global Technology (United States) Inc., Morrisville, NC (US)

(72) Inventors: Michael Demeter, Morrisville, NC (US); William L. Jaeger, Jr., Morrisville, NC (US); Pierre Mouallem, Morrisville, NC (US); Scott Piper, Morrisville, NC (US)

(73) Assignee: Lenovo (United States) Inc., Morrisville, NC (US)

( * ) Notice: Subject to any disclaimer, the term of this patent is extended or adjusted under 35 U.S.C. 154(b) by 373 days.

(21) Appl. No.: 17/480,211

(22) Filed: Sep. 21, 2021

(65) Prior Publication Data

US 2023/0092455 A1 Mar. 23, 2023

(51) Int. Cl.
G06F 21/44 (2013.01)
G06F 21/62 (2013.01)
H04L 9/40 (2022.01)

(52) U.S. Cl.
CPC .......... *G06F 21/44* (2013.01); *G06F 21/6218* (2013.01); *H04L 63/107* (2013.01); *G06F 2221/2111* (2013.01)

(58) Field of Classification Search
CPC .................. G06F 21/6218; G06F 2221/2111
See application file for complete search history.

(56) References Cited

U.S. PATENT DOCUMENTS 7,450,930 B2 * 11/2008 Williams .............. H04W 4/029
380/258
7,496,948 B1 * 2/2009 Hamilton, II ....... H04L 63/0853
380/258

(Continued)

OTHER PUBLICATIONS

Scott, Logan, et al., "A Location Based Encryption Technique and Some of Its Applications", Ion NRM, Anaheim, CA, Jan. 22-24, 2003, pp. 734-735.

(Continued)

*Primary Examiner* — Jerry B Dennison
(74) *Attorney, Agent, or Firm* — Olive Law Group, PLLC

(57) ABSTRACT

Systems and methods for managing access to data based on a geographic location requirement are disclosed herein. According to an aspect, a system includes a first computing device comprising a data storage manager configured to manage access to stored data based on one or more predetermined rule(s) that specifies geographic location requirement(s) for permissible access to the stored data. The manager is also configured to receive, from a second computing device, a request to access the data. Further, the manager is configured to determine a geographic location of the second computing device, determine whether the geographic location of the second computing device meets the geographic location requirement(s), and permit or deny access to the stored data by the second computing device in response to determining that the geographic location of the second computing device meets the geographic location requirement(s). Furthermore, the geographic location of the client is dynamically tracked to ensure ongoing compliance with the location rule(s), and if at any point the client becomes non-compliant, access to the data is denied and the data stored on the client is deleted by the server.

20 Claims, 6 Drawing Sheets

(56) References Cited

U.S. PATENT DOCUMENTS

| | | | | |
|---|---|---|---|---|
| 8,311,513 | B1* | 11/2012 | Nasserbakht | H04L 63/083 |
| | | | | 455/457 |
| 9,401,915 | B2* | 7/2016 | DeWeese | H04L 63/0428 |
| 9,622,077 | B2* | 4/2017 | Hughes | G06F 21/31 |
| 11,317,292 | B1* | 4/2022 | Feldmann | H04W 12/08 |
| 11,632,366 | B1* | 4/2023 | Shemesh | H04L 67/1004 |
| | | | | 726/3 |
| 2002/0051540 | A1* | 5/2002 | Glick | H04L 67/52 |
| | | | | 713/168 |
| 2010/0058398 | A1* | 3/2010 | Ojala | H04N 21/4826 |
| | | | | 725/62 |
| 2014/0289827 | A1* | 9/2014 | Tang | H04L 63/107 |
| | | | | 726/6 |
| 2015/0237052 | A1* | 8/2015 | Brique | G06F 21/6209 |
| | | | | 726/1 |
| 2017/0279733 | A1* | 9/2017 | Marshall | G06F 21/31 |
| 2019/0138740 | A1* | 5/2019 | Ricknäs | G06F 3/04842 |
| 2019/0188368 | A1* | 6/2019 | Hastings | H04L 63/0492 |
| 2019/0239076 | A1* | 8/2019 | Chauhan | H04L 67/34 |
| 2020/0053090 | A1* | 2/2020 | Kliger | G06F 18/214 |
| 2020/0127994 | A1* | 4/2020 | Kukreja | G06F 21/31 |
| 2021/0168455 | A1* | 6/2021 | Campbell | H04L 9/3213 |
| 2021/0279355 | A1* | 9/2021 | Otte | G06F 21/6218 |
| 2023/0092455 | A1* | 3/2023 | Demeter, III | G06F 21/44 |
| | | | | 726/2 |

OTHER PUBLICATIONS

Bertino, Elisa, et al., "Location-Based Access Control Systems for Mobile Users—Concepts and Research Directions", SPRINGL '11, Chicago, IL, Nov. 1, 2011 (4 pp.).

Scott, Logan, et al.,"Geo-Encryption: Using GPS to Enhance Data Security", GPS World, Apr. 2003, pp. 38-47.

* cited by examiner

SYSTEMS AND METHODS FOR MANAGING ACCESS TO DATA BASED ON A GEOGRAPHIC LOCATION REQUIREMENT

TECHNICAL FIELD

The presently disclosed subject matter relates generally to data storage and security. Particularly, the presently disclosed subject matter relates to systems and methods for managing access to data based on a geographic location requirement.

BACKGROUND

Servers are computers that provide functionality for other computing devices, referred to as clients. For example, a server can provide functionality such as computing resources among multiple clients and also access to stored data. In operation to provide access to stored data, a client requests access to the stored data, and the server responds by permitting or denying access to the requested data. If access is permitted, the server can transmit the requested data to the client.

Security is a very important function of servers when providing data access to clients. The stored data is typically highly sensitive and precautions must be taken to prevent security breaches. Data security can involve deploying tools and technologies that authenticate client users seeking to access the data and block access to unauthorized users. Security tools provide protections such as data masking, encryption, and redaction of sensitive files. In addition, unauthorized attempts at access can be reported.

Governments have different regulations with regard to data storage. Particularly, in many cases government regulations require that data is secure and only accessible in certain geographic locations. In view of this concern and other current challenges with maintaining data security, there is a continuing need for improved systems and techniques for managing and providing access to stored data.

BRIEF DESCRIPTION OF THE DRAWINGS

Figure 1:
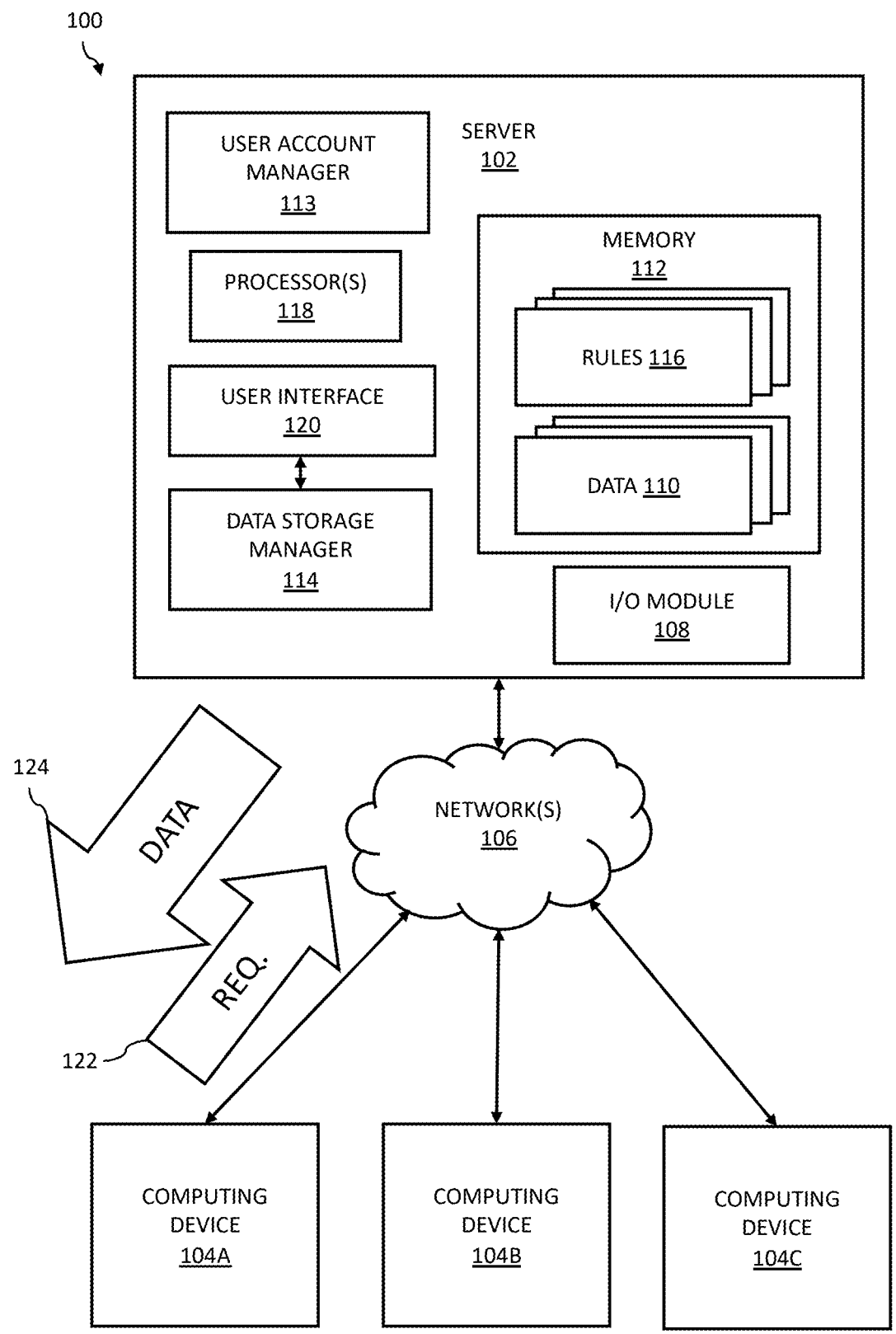
Figure 2:
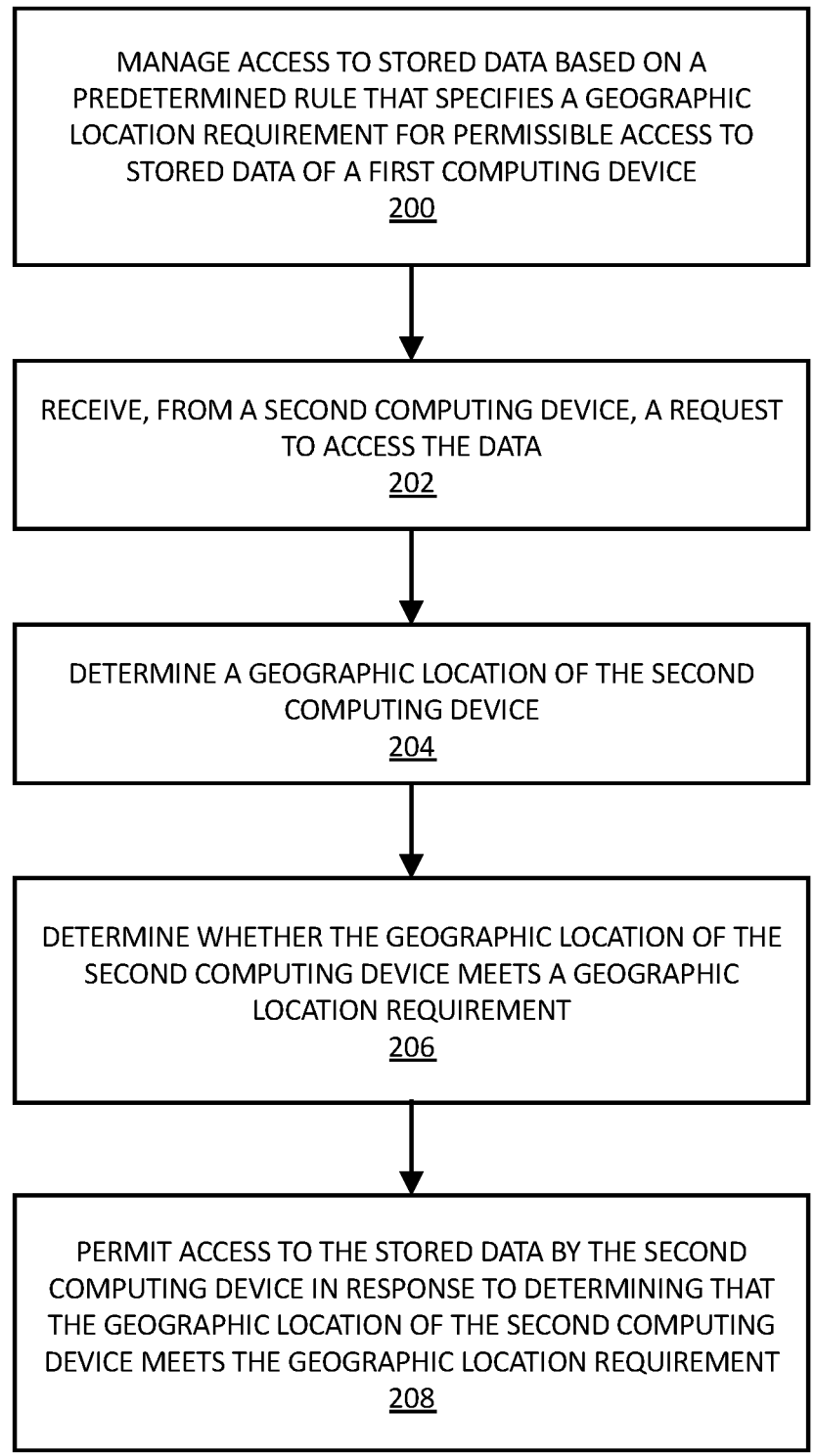
Figure 3:
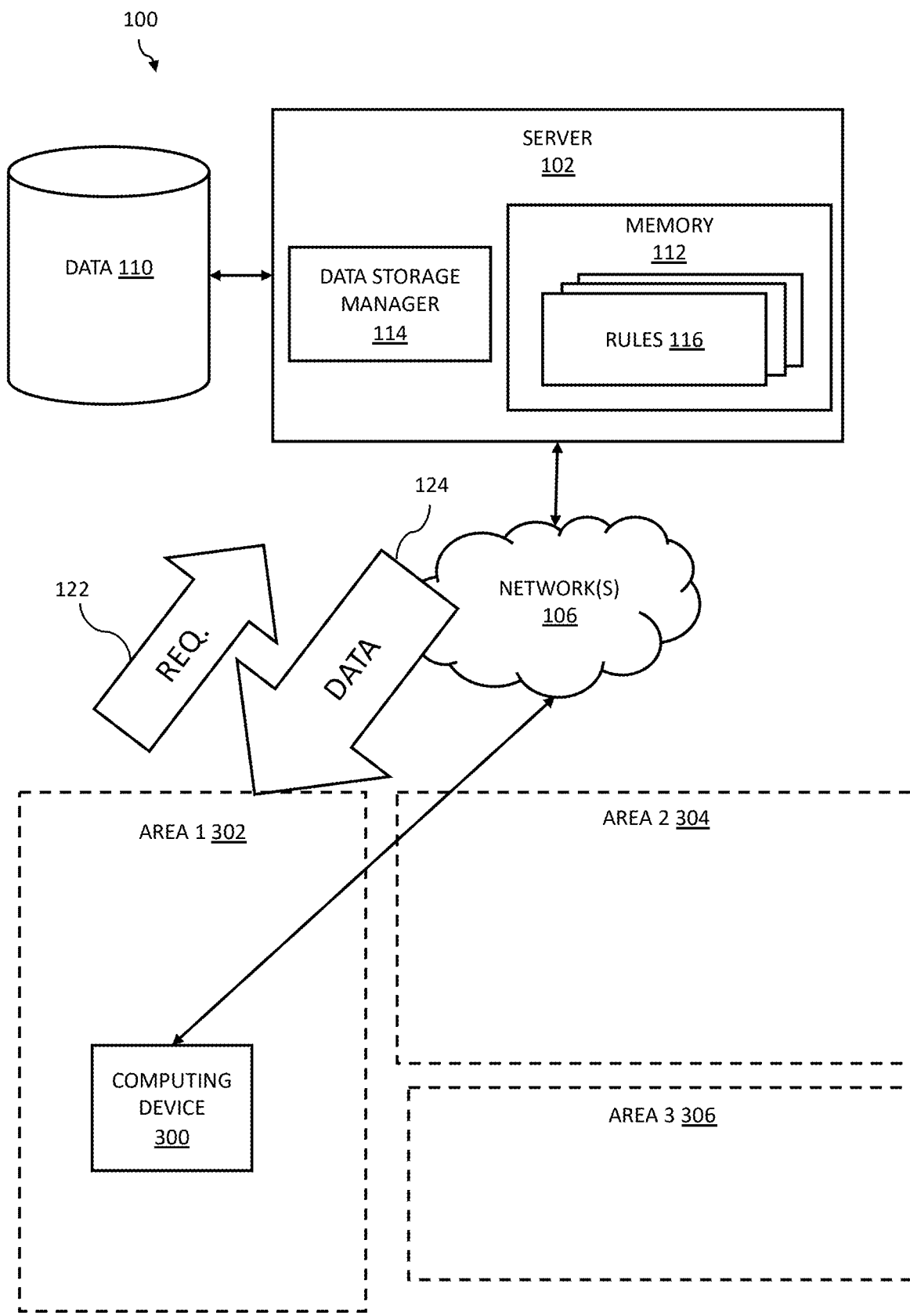
Figure 4:
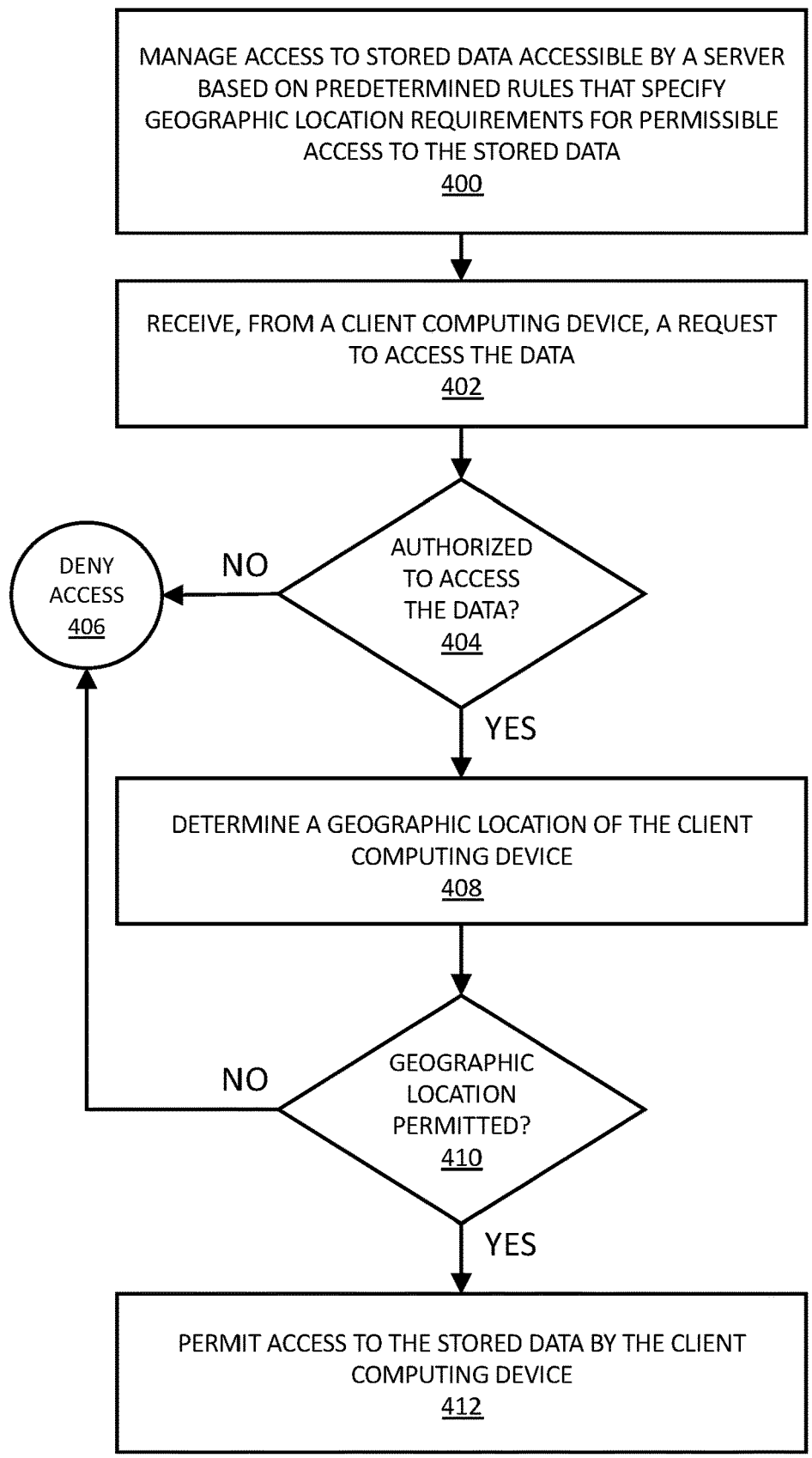
Figure 5:
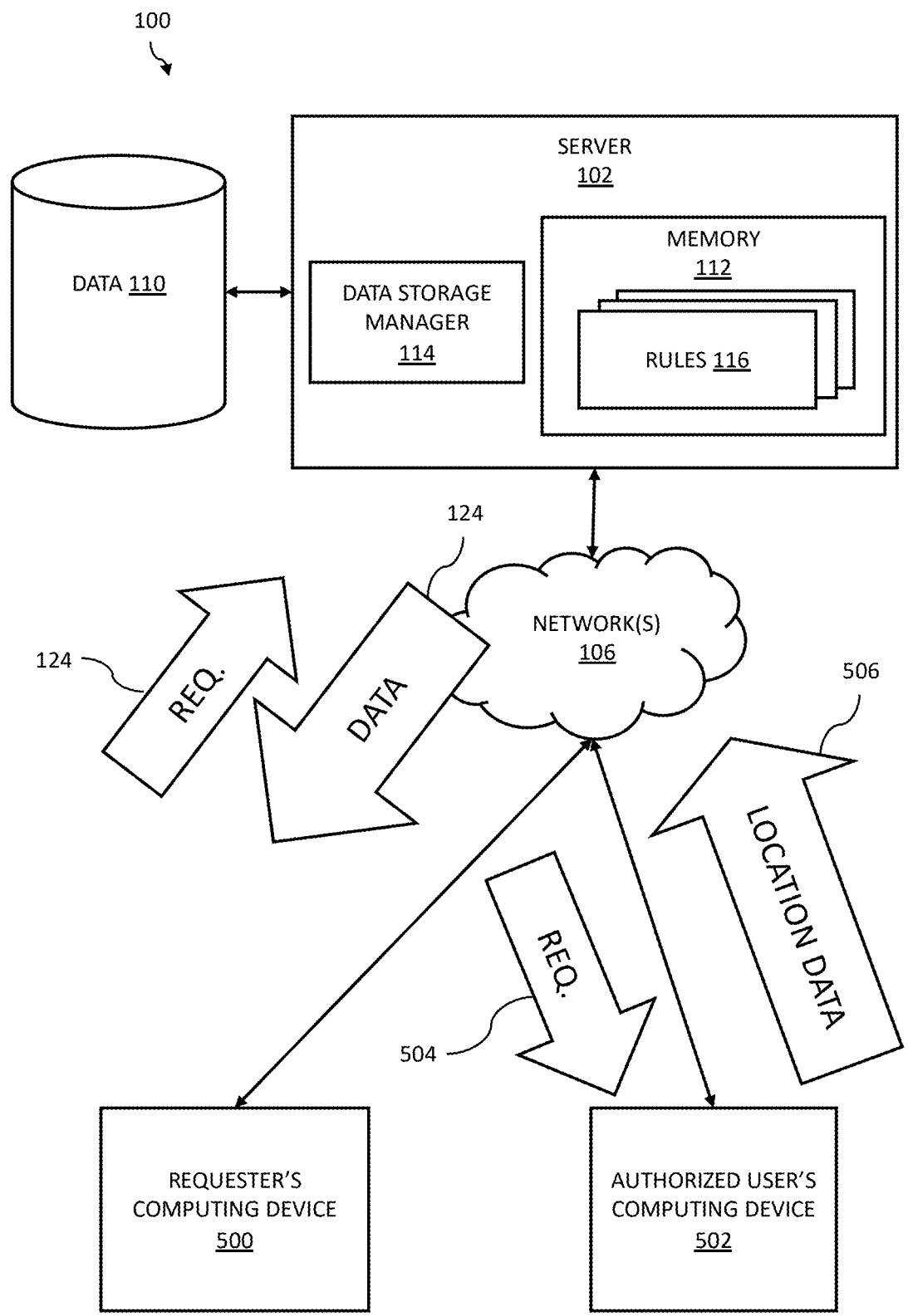
Figure 6:
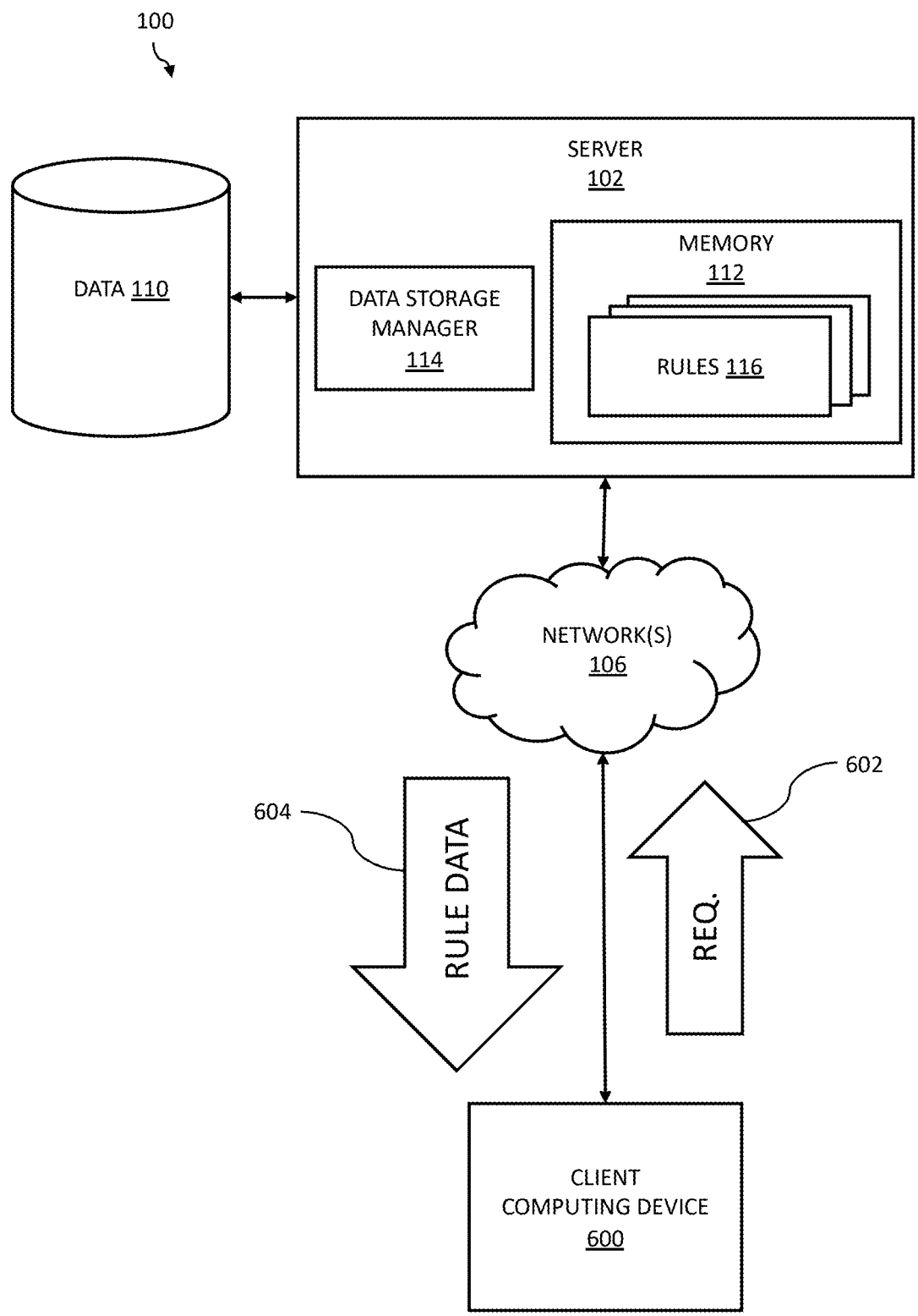

Having thus described the presently disclosed subject matter in general terms, reference will now be made to the accompanying Drawings, which are not necessarily drawn to scale, and wherein:

FIG. 1 is a block diagram of a system for managing access to data based on a geographic location requirement in accordance with embodiments of the present disclosure;

FIG. 2 is a flow diagram of an example method for managing access to data based on a geographic location requirement in accordance with embodiments of the present disclosure;

FIG. 3 is a block diagram depicting a server and a computing device within a geographic area permissible for access to stored data in accordance with embodiments of the present disclosure;

FIG. 4 is a flow diagram of another example method for managing access to data based on a geographic location requirement in accordance with embodiments of the present disclosure;

FIG. 5 a block diagram depicting a server, a data requester's computing device, and an authorized user's computing device in accordance with embodiments of the present disclosure; and FIG. 6 is a block diagram of a system including a client computing device requesting and receiving rules and rule updates from a server in accordance with embodiments of the present disclosure.

SUMMARY

The presently disclosed subject matter relates to systems and methods for managing access to data based on a geographic location requirement. According to an aspect, a system includes a first computing device comprising a data storage manager configured to manage access to stored data based on a predetermined rule that specifies a geographic location requirement for permissible access to the stored data. The manager is also configured to receive, from a second computing device, a request to access the data. Further, the manager is configured to determine a geographic location of the second computing device, determine whether the geographic location of the second computing device meets the geographic location requirement, and permit access to the stored data by the second computing device in response to determining that the geographic location of the second computing device meets the geographic location requirement.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In another example, a computing device may be a mobile computing device such as, for example, but not limited to, a smart phone, a cell phone, a pager, a personal digital assistant (PDA), a mobile computer with a smart phone client, or the like. In another example, a computing device may be any type of wearable computer, such as a computer with a head-mounted display (HMD), or a smart watch, or some other wearable smart device. Some of the computer sensing may be part of the fabric of the clothes the user is wearing. A computing device can also include any type of conventional computer, for example, a laptop computer or a tablet computer. A typical mobile computing device is a wireless data access-enabled device (e.g., an iPHONE® smart phone, a NEXUS ONE™ smart phone, an iPAD® device, smart watch, or the like) that is capable of sending and receiving data in a wireless manner using protocols like the Internet Protocol, or IP.

As used herein, the term "memory" is generally a storage device of a computing device. Examples include, but are not limited to, read-only memory (ROM) and random access memory (RAM). Additional examples include disk-based or flash-based storage.

As referred to herein, the terms "computing device" and "entities" should be broadly construed and should be understood to be interchangeable. They may include any type of computing device, for example, a server, a desktop computer, a laptop computer, a smart phone, a cell phone, a pager, a personal digital assistant (PDA, e.g., with GPRS NIC), a mobile computer with a smartphone client, or the like.

As referred to herein, a user interface is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. The display object can be displayed on a display screen of a computing device and can be selected by and interacted with by a user using the user interface. In an example, the display of the computing device can be a touch screen, which can display the display icon. The user can depress the area of the display screen where the display icon is displayed for selecting the display icon. In another example, the user can use any other suitable user interface of a computing device, such as a keypad, to select the display icon or display object. For example, the user can use a track ball or arrow keys for moving a cursor to highlight and select the display object.

The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or times program instructions thereon for causing a processor to carry out aspects of the present disclosure.

As referred to herein, a computer network may be any group of computing systems, devices, or equipment that are linked together. Examples include, but are not limited to, local area networks (LANs) and wide area networks (WANs). A network may be categorized based on its design model, topology, or architecture. In an example, a network may be characterized as having a hierarchical internetworking model, which divides the network into three layers: access layer, distribution layer, and core layer. The access layer focuses on connecting client nodes, such as workstations to the network. The distribution layer manages routing, filtering, and quality-of-server (QoS) policies. The core layer can provide high-speed, highly-redundant forwarding services to move packets between distribution layer devices in different regions of the network. The core layer typically includes multiple routers and switches.

FIG. 1 illustrates a block diagram of a system 100 for managing access to data based on a geographic location requirement in accordance with embodiments of the present disclosure. Referring to FIG. 1, the system 100 includes a server 102 operable to communicate with multiple computing devices 104A-104C via one or more communications networks 106. In this example, 3 computing devices 104A-104C are shown as being communicatively connected to the server 102, although it should be understood that any suitable number of computing devices may be communicatively connected to the server via the network(s) 106. The server 102 may include an input/output (I/O) module 108 configured to connect the server 102 to the network(s) 106 for receipt of communications from client computing devices and for providing requested data to the client computing devices.

One or more of the computing devices 104A-104C may be clients authorized to access some or all of the data 110 stored in memory 112 of the server 102. It is noted that in this example the stored data 110 is described as being part of the server 102, but some or more of the data considered stored by the server 102 may be data accessible by the server 102 but a part of another electronic component. The server 102 can receive requests from client computing devices, process the requests, and provide access to the requested data to authorized client computing devices in accordance with embodiments of the present disclosure.

Permitted access may only be to authorized clients located in or outside particular geographic location(s) in accordance with one or more predetermined rules. In an example, permission to access the data may include retrieving the stored data and providing the stored data to the requesting client computing device. In another example, permission to access the data may include decrypting the stored data for the requesting client computing device. In accordance with embodiments, a rule set by an operator may be evaluated to determine whether it is in accordance with one or more other geographic location rules. For example, an overall rule may restrict access to data to users at a particular location, and other rules can be evaluated to assure that they are in accordance with this overall rule and not counter to it.

The server 102 includes a user account manager 113 configured to manage account of each user. Further, the user account manager 113 may be configured to receive a request to implement actions associated with accounts. Example actions include, but are not limited to, resetting an account, changing a predetermined setting of an account (e.g., a login setting), changing a login setting of an account, retrieving predetermined data from an account, and the like. An authorized user may utilize a computing device to communicate requests to the server 102 for accessing data 110 in an account and for requesting actions associated with the account. The user account manager 113 may receive the requests and implement the actions.

The server 102 includes a data storage manager 114 configured to manage access to the stored data 110 based on predetermined rules 116. The rules 116 each specify one or more geographic location requirements for permissible access to different portions or all the stored data 110. The data storage manager 114 may be implemented by hardware, software, firmware, or combinations thereof. For example, the functionalities of the data storage manager 114 described herein may be implemented by one or more processors 118 that run instructions stored in memory 112. The server 102 may include a user interface 120 for input or modification of the rules 116. For example, the user interface 120 may be used to add, modify, or delete data by a data owner. The user interface 120 may, for example, include a keyboard, mouse, display, and/or a web browser for input of the rules and user feedback information. In another example, the server 102 may suitably receive communications for an authorized operator for inputting or modifying the rules 116.

FIG. 2 illustrates a flow diagram of an example method for managing access to data based on a geographic location requirement in accordance with embodiments of the present disclosure. The example method is described as being implemented by the server 102 shown in FIG. 1, but it should be understood that the method may alternatively be suitably implemented by one or more other computing devices. Particularly, in this example, the method is described as being implemented by the data storage manager 114.

Referring to FIG. 2, the method includes managing 200 access to stored data based on a predetermined rule that specifies a geographic location requirement for permissible access to the stored data. For example, the data storage manager 114 can manage access to the stored data 110 in accordance with the rules 116. The data storage manager 114 can receive identification of particular data 110, retrieve the identified data 110, and communicate it to a requesting computing device. Further, the data storage manager 114 may determine whether a requester is authorized and permitted to access the data in accordance with embodiments disclosed herein.

The method of FIG. 2 also includes receiving 202, from a second computing device, a request to access the data. Continuing the aforementioned example, the data storage manager 114 can receive a request 122 from the computing device 104A. The request 122 can include the requesting device or user, and also identify a portion of data 110 for access by the computing device 104A.

The method of FIG. 2 includes determining 204 a geographic location of the second computing device. Continuing the aforementioned example, the request 122 can identify a geographic location of the computing device 104A. Alternatively, the geographic location of the computing device 104A may be indicated apart from the request 122. Example techniques for determining a geographic location of a computing device include, but are not limited to, receiving global positioning system (GPS) data that indicates the location of the computing device, receiving an Internet protocol (IP) address of the computing device, receiving wireless access point data of the computing device, and/or the like. A geographic location may be determined, for example, by determining proximity by use of proximity data over Bluetooth, NFC, or UWB (ultra-wide band). Other examples include use of location data acquired by nearby wireless access point and other RF environment information, correlated with GPS.

The method of FIG. 2 includes determining 206 whether the geographic location of the second computing device meets the geographic location requirement. Continuing the aforementioned example, one or more rules 116 can be associated with the identified data requested for access by the computing device 104A. The data storage manager 114 can identify and process the rules 116 associated with the identified data 110. The rule(s) 116 associated with the requested data 110 can then be applied by the data storage manager 114. For example, the associated rule(s) 116 can indicate a permitted geographic location for accessing the stored data and/or a disallowed geographic location for accessing the stored data. As example, a geographic location may be indicated by GPS coordinates and an area surrounding the GPS coordinates, coordinates of a boundary within which the computing device may be located to access the data, or other location information indicating an area within which the computing device is not allowed to access the data.

The method of FIG. 2 includes permitting 208 access to the stored data by the second computing device in response to determining that the geographic location of the second computing device meets the geographic location requirement. Continuing the aforementioned example, the data storage manager 114 can determine whether the geographic location of the computing device 104A is within an area permitted by a rule 116 associated with the requested data. In response to determining that the geographic location of the computing device 104A is within an area permitted by the rule 116, the data storage manager 114 can permit the computing device 104A to access the requested data 110. Access to the data 110 can include, for example, the server 102 communicating the requested data to the computing device 104A and/or decrypting the requested data 110. For example, the requested data 124 can be communicated from the computing device 102 to the computing device 104A via the network(s) 106.

In another example, the data storage manager 114 can determine whether the geographic location of the computing device is within an area not permitted by a rule associated with the requested data. In response to determining that the geographic location of the computing device is within an area not permitted, the data storage manager 114 can prevent access to the data 110. In addition, the data storage manager 114 can provide a report via the user interface 120 or a user interface at another computing device to indicate the attempt to access the data was not in accordance with the associated rule 116.

FIG. 3 illustrates a block diagram depicting a server 102 and a computing device 300 within a geographic area permissible for access to stored data in accordance with embodiments of the present disclosure. Referring to FIG. 3, the server 102 includes a data storage manager 114 and memory 112 having rules that specify geographic location requirements for permissible access to data 110 in accordance with embodiments disclosed herein. In this example, the data 110 is stored in memory separate from the server 102 but accessible by the server 102. One of the rules 116 can specify one or more geographic locations where a computing device may be located to access certain data 110. For example, a rule 116 can indicated that geographic areas 1 and 2, indicated by reference numbers 302 and 304, respectively, are permissible. In another example, a rule 116 can indicate that area 3 306 is not permissible.

In the example of FIG. 3, computing device 300 is located within the permissible area 1 302. Further, the computing device 300 communicates a request 122 for stored data 110. The data storage manager 114 at the server 102 can receive the request 122. The request 122 can indicate the GPS coordinates of the computing device 300. It is noted that, in the alternative, rather than GPS coordinates any suitable geographic location information may be used in accordance with examples provided herein. The data storage manager 114 can subsequently access a rule 116 associated with the requested data 110 and determine whether the GPS coordinates are within an area identified as being permissible for the access of the data 110. In response to determining that the access is permissible based on the GPS coordinates, the data storage manager 114 can access the data and send the data 124 to the computing device 300 via the network(s) 106. In response to determining that the access is not permissible based on the GPS coordinates, the data storage manager 114 can prevent access to the data 110.

FIG. 4 illustrates a flow diagram of another example method for managing access to data based on a geographic location requirement in accordance with embodiments of the present disclosure. The example method of FIG. 4 is described as being implemented by the server 102 shown in FIG. 2, but it should be understood that the method may alternatively be suitably implemented by one or more other computing devices. Particularly, in this example, the method is described as being implemented by the data storage manager 114.

Referring to FIG. 4, the method includes managing 400 access to stored data based on multiple predetermined rules that specify geographic locations requirements for permissible access to the stored data. For example, the data storage manager 114 of the server 102 shown in FIG. 3 can manage access to the stored data 100 in accordance with the rules 116. One or more of the rules 116 can be associated with a particular portion of the data, and can specify a geographic location where it is permissible for an authorized computing device to be located to access that portion of the data. Authorized operators or users (e.g., "owners" of the data 110) can input and manage the rules 116 for their respective data. These authorized operators can add, delete, or modify rules 116 for their respective data. For example, an operator can modify a rule to specify a different geographic location where it is permissible for an authorized computing device to be located to access that portion of the data. Further, for example, the data storage manager 114 can determine whether the operator (or user) is authorized to set the rule, and permit association of the rule with the stored data in response to determining that the user is authorized to set the rule.

The method of FIG. 4 includes receiving 402, from a client computing device, a request to access the data. Continuing the aforementioned example, the server 102 can receive a request 122 that identifies the client associated with the computing device 300 and also a geographic location of the computing device 300. For example, the request 122 can identify the client. The request 122 may be communicated to the server 102 via network(s) 106.

The method of FIG. 4 includes determining 404 whether identification of the client is authorized for accessing the data. Continuing the aforementioned example, the data storage manager 114 can determine whether the identification of the client is authorized for accessing the requested data. In response to determining that identification of the client is not authorized for accessing the data, the method includes denying 406 access to the requested data by the client. For example, the data storage manager 114 can deny the access. In response to determining that identification of the client is authorized for accessing the data, the method proceeds to Step 408.

At Step 408, the method of FIG. 4 includes determining 408 a geographic location of the client computing device. Continuing the aforementioned example, request 122 can identify the area 1 300 where the computing device 300 is located. For example, the geographic location of the computing device 300 may be identified by GPS coordinates determined by a GPS receiver of the computing device 300. Alternatively, for example, the geographic location of the computing device 300 may be identified by network equipment used to communicate the request 122 to the server 102.

Subsequent to Step 408, the method of FIG. 4 includes determining 410 whether a geographic location of the client computing device is permitted. Continuing the aforementioned example, the data storage manager 114 can determine whether the GPS coordinates of the computing device 300 is within area 1 300, which is permitted for accessing the requested data in accordance with a rule 116 associated with the requested data. In response to determining that the geographic location of the client computing device is not permitted, the method proceeds to Step 406 where access is denied. Otherwise, in response to determining that the geographic location of the client computing device is permitted, the method proceeds to Step 412.

At Step 412 of FIG. 4, the method includes permitting access to the stored data by the client computing device. Continuing the aforementioned example, the server 102 can retrieve the requested data 110, and then communicate a copy 124 of the requested data to the computing device 300.

In example case scenarios, an "allowed" or permitted geographic location can either be fixed to a town, state, country, region, or the like. In another example of a permitted location, the geographic location can be relative to a specific point (e.g., within 50 feet of a corporate office).

In other example case scenarios, a negative condition can be applied to a rule. For example, a rule can specify disallowed regions, or an area can be disallowed if the requesting computing device is within 100 feet of a position.

In another example case scenario, additional security can be provided by configuring the decryption engine to destroy or delete the data if a decryption attempt takes place in an unapproved geographic location. Further, the owner or designated authority that manages the rule can update the rules at any point and also track all access/decryption requests and where they originate from. In another example, the data storage manager can flag the stored data or delete the data in response to determining that the geographic location of the computing device does not meet the geographic location requirement.

In accordance with embodiments, a rule may additionally specify that a request for data access must be approved by a designated person, such as the owner of the data. For example, in addition to a geographic location requirement as described herein, the rule may require approval of the owner upon a request for the associated data.

In accordance with embodiments, a rule may be set that specifies that a user requesting data access must be within a predetermined distance of one or more authorized users, devices, and/or locations. For example, the rule may specify that a user requesting data access must be within a predetermined distance of a computing device of another user determined to be an authorized user. FIG. 5 is a block diagram depicting a server 102, a data requester's computing device 500, and an authorized user's computing device 502 in accordance with embodiments of the present disclosure. Referring to FIG. 5, a data requester can interact with computing device 500 for requesting data from the server 102. The computing device 500 can send the request 122, which includes an indication of the coordinates of the computing device 500. The data storage manager 114 of the server 102 can subsequently access a rule 116 associated with the requested data. The rule 116 can specify that, for the requested data, a requester's computing device must be within a predetermined location of an unauthorized user's computing device in order to permit access to the requested data. In an example, the data storage manager 114 can compare determined locations of the requester's computing device 500 and the authorized user's computing device 502 to determine whether a distance between the devices 500 and 502 meets the criteria. The data storage manager 114 can permit access to the data in response to determining that the distance between them meets the rule's criteria (i.e., that the devices are within the predetermined distance). In response to determining that the devices are not within the predetermined distance, the data storage manager 114 can deny access to the requested data.

With continuing reference to FIG. 5, a distance between the computing devices 500 and 502 may be determined by use of the coordinates received by the computing device 500 in the request 122 or any other suitable technique for determining its location. The data storage manager 114 can determine the location of computing device 502 by any suitable technique. For example, the data storage manager 114 can send a request 504 to the computing device 502 for its location data. In response to receipt of the request 504, the computing device 502 can send location data 506 to the server 102 for use in comparing the location of the computing device 502 to the location of the requester's computing device 500.

It is noted that although FIG. 5 is described as applying a rule to compare the distance between the requester's computing device 500 and an authorized user's computing device 502, the location of the requester's computing device 500 may alternatively be compared to another device or location. The rule may specify another device or particular location. In this instance, the data storage manager 114 can compare the requester's computing device 500 to the other device or location for determining whether they are within a predetermined distance. In response to determining that they are within the predetermined distance, then permission can be granted. Otherwise, the permission can be denied.

In accordance with embodiments, a rule may be set that specifies that a user requesting data access must be at least a predetermined distance from one or more unauthorized users, devices, and/or locations. Another rule may be set that specifies that a user requesting data access must be at least a predetermined distance from any other users, devices, and/or locations. For example, the data storage manager 114 may determine a location of the requester's computing device 500 in accordance with embodiments disclosed herein. Also, the data storage manager 114 can determine a location of an unauthorized user's device and/or other locations via a suitable technique. The data storage manager 114 can compare the requester's computing device 500 to the unauthorized user's device or location for determining whether they are within a predetermined distance. In response to determining that they are within the predetermined distance, then permission can be granted. Otherwise, the permission can be denied. Similarly, the rule concerning any other users, devices, and/or locations can be similarly applied to determine the distance for either granting or denying data access.

In accordance with embodiments, a client computing device, such as the computing device 500, can store rules as described herein. The rules can be periodically updated. For example, a server can communicate to the client computing device updates to the rules. Further, for example, the rules may be regularly refreshed and re-evaluated each event to check for compliance with any updates. As an example, FIG. 6 illustrates a block diagram of a system including a client computing device 600 requesting and receiving rules and rule updates from a server in accordance with embodiments of the present disclosure. Referring to FIG. 6, the client computing device 600 can regularly poll the server 102 for new rules or rule updates. For example, a request 602 can be sent to the server 102 via the network(s) 106. In response to receipt of the request 602, the data storage manager 114 may check for new rules and updated rules in its memory 112. The data storage manager 114 can subsequently send any new rules and updates 604 to the client computing device 600. Alternative to the computing device 600 sending a request for new rules and updates, the server 102 may be configured to automatically send new rules and updates to client computing devices.

It is noted that application of rules can be dynamically applied. For example, data access may be permitted as long as the rule's criteria are met. However, the data storage manager 114 can check compliance with one or more rules by a computing device and deny access in response to determining that the rule's criteria are no longer met. For example with reference to FIG. 3, a rule may specify that data access is permitted while the computing device 300 is within area 1 300. In this example, areas 2 and 3 (302 and 304, respectively) may not be permitted for data access according to the rule. The data storage manager 114 may determine that the computing device 300 has moved to area 2 or area 3 and subsequently deny data access in response to determining that the computing device 300 is no longer in compliance with the rule. Further, for example, a response to non-compliance to a rule may include erasing the data cached at the client computing device.

In accordance, a client may have a "Trusted Computing Base (TCB)" to represent a client-side area that can be relied upon to execute the rules in a more guaranteed and trustworthy manner. The trusted computing base (TCB) of a computer system is the set of all hardware, firmware, and/or software components that are critical to its security. By contrast, parts of a computer system outside the TCB must not be able to misbehave in a way that would compromise the defined security rules or security policy. A TCB can be leveraged to store the data retrieved from the server once the client is validated to meet the location ruleset. If the client location changes and becomes non-compliant, the data would then be deleted from the client by the server.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

The device or system for performing one or more operations on a memory of a computing device may be software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, flash storage (e.g., USB thumb drive, SD card, and the like), etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, JavaScript, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A system comprising:
    a first computing device comprising a data storage manager configured to:
        store data;
        manage access to the stored data based on a predetermined rule that specifies a proximity requirement for permitting or denying access to the stored data;
        receive, from a second computing device, a request to access the data;
        determine, at a first time, a geographic location of the second computing device;
        determine whether there is at least a predetermined distance between the second computing device and a third computing device of another user at the first time;
        determine that the user of the third computing device is an authorized user;
        permit access to the stored data by the second computing device in response to determining that a distance between the second computing device and the third computing device is less than the at least the predetermined distance and that the user of the third computing device is an authorized user;
        determine, at a second time, a geographic location of the second computing device;
        determine whether there is at least a predetermined distance between the second computing device and the third computing device of the other user at the second time; and
        deny access to the stored data by the second computing device in response to determining that the distance between the second computing device and the other computing device at the second time is greater than the at least the predetermined distance or that the user of the third computing device is not an authorized user.

2. The system of claim 1, wherein the first computing device comprises a server, and
    wherein the second computing device is a client computing device.

3. The system of claim 1, wherein the data storage manager is configured to receive, from a user, instruction to associate the predetermined rule with the stored data.

4. The system of claim 3, wherein the data storage manager is configured to:
    determine whether the user is authorized to set the predetermined rule; and
    permit association of the predetermined rule with the stored data in response to determining that the user is authorized to set the predetermined rule.

5. The system of claim 1, wherein the data storage manager is configured to receive the request via one or more communications networks.

6. The system of claim 1, wherein the data storage manager is configured to receive identification of the geographic location of the second computing device from one of the second computing device or communications network equipment.

7. The system of claim 6, wherein the identification of the geographic location comprises global positioning system (GPS) data, an Internet protocol address, and/or wireless access point data.

8. The system of claim 1, wherein the data storage manager is configured to:
    receive, from the second computing device, identification of a user of the second computing device;
    determine whether the identification of the user of the second computing device is authorized for accessing the stored data;
    permit the access to the stored data in response to determining that the identification of the user of the second computing device is authorized for accessing the stored data and the geographic location of the second computing device complies with the predetermined rule; and deny the access to the stored data in response to determining that the identification of the user of the second computing device is not authorized for accessing the stored data.

9. The system of claim 1, wherein the data storage manager is configured to communicate, to the second computing device, the stored data in response to permission of the access and determining that the second computing device is at least the predetermined distance from the third computing device.

10. The system of claim 1, wherein permission to access the stored data comprises permission to retrieve the stored data by the second computing device and/or decrypt the stored data for the second computing device.

11. The system of claim 1, wherein the data storage manager is configured to flag the stored data at the first computing device or delete the data at the second computing device in response to determining that the second computing device is not at least the predetermined distance from the third computing device.

12. The system of claim 1, wherein the data storage manager is configured to manage access to the stored data based on a geographic location requirement that indicates one of a permitted geographic location for accessing the stored data or a disallowed geographic location for accessing the stored data.

13. The system of claim 1, wherein the data storage manager is configured to one of modify the predetermined rule or replace the predetermined rule with another predetermined rule specifying a geographic location requirement for permissible access to the stored data.

14. The system of claim 1, wherein the data storage manager is configured to:
manage access to the stored data based on one or more other predetermined rules specifying one or more other geographic location requirements for permissible access to the stored data; and
permit access to the stored data by the second computing device based on the one or more other predetermined rules.

15. The system of claim 1, wherein the predetermined rule specifies a proximity requirement to a location for permitting or denying access to the stored data, and
wherein the data storage manager is configured to:
determine whether there is at least a predetermined distance to the location specified by the rule;
permit access to the stored data in response to determining that the second computing device is at least the predetermined distance from the location; and
deny access in response to determining that there is not the predetermined distance to the location.

16. The system of claim 1, wherein the second computing device is configured to store the predetermined rule and apply it for permitting or denying access to the stored data.

17. The system of claim 16, wherein the second computing device is configured to receive new rules for accessing the stored data and/or to receive updates to rules for accessing the stored data.

18. A method comprising:
storing data at a first computing device;
managing access to the stored data at the first computing device based on a predetermined rule that specifies a proximity requirement for permissible or denied access to the stored data;
receiving, from a second computing device, a request to access the data;
determining, at a first time, a geographic location of the second computing device;
determining whether there is at least a predetermined distance between the second computing device and a third computing device of another user at the first time;
determining that the user of the third computing device is an authorized user;
in response to determining that a distance between the second computing device and the third computing device is less than the at least the predetermined distance and that the user of the third computing device is an authorized user, permitting access to the stored data by the second computing device;
determining, at a second time, a geographic location of the second computing device;
determining whether there is at least a predetermined distance between the second computing device and the third computing device of the other user at the second time; and
in response to determining that the distance between the second computing device and the other computing device at the second time is greater than the at least the predetermined distance or that the user of the third computing device is not an authorized user, denying access to the stored data by the second computing device.

19. The method of claim 18, wherein permission to access the stored data comprises permission to retrieve the stored data by the second computing device and/or decrypt the stored data for the second computing device.

20. The method of claim 18, further comprising:
receiving, from the second computing device, identification of a user of the second computing device;
determining whether the identification of the user of the second computing device is authorized for accessing the stored data;
permitting the access to the stored data in response to determining that the identification of the user of the second computing device is authorized for accessing the stored data and a geographic location of the second computing device complies with the predetermined rule; and
denying the access to the stored data in response to determining that the identification of the user of the second computing device is not authorized for accessing the stored data.

* * * * *